United States Patent [19]
Thorne et al.

[11] Patent Number: 5,555,672
[45] Date of Patent: Sep. 17, 1996

[54] SYSTEM FOR TERMITE DETECTION AND CONTROL

[76] Inventors: Barbara L. Thorne, 4306 Woodberry St., University Park, Md. 20782; James F. A. Traniello, 11 Smith Ave., Lexington, Mass. 02173

[21] Appl. No.: 277,420

[22] Filed: Jul. 18, 1994

Related U.S. Application Data

[63] Continuation-in-part of Ser. No. 941,460, Sep. 8, 1992, Pat. No. 5,329,726.

[51] Int. Cl.⁶ .................................................. A01M 1/20
[52] U.S. Cl. ................................................ 43/124; 43/131
[58] Field of Search .......................... 43/124, 131, 107, 43/132.1

[56] References Cited

U.S. PATENT DOCUMENTS

| | | | |
|---|---|---|---|
| 1,013,514 | 1/1912 | Rand | 43/131 |
| 3,017,717 | 1/1962 | Caubre | 43/131 |
| 3,466,789 | 9/1969 | Kare | 43/131 |
| 4,485,582 | 12/1984 | Morris | 43/131 |
| 4,837,969 | 6/1989 | Demarest | 43/131 |
| 4,894,947 | 1/1990 | Brandli | 43/124 |
| 4,945,673 | 8/1990 | Lavelle | 43/124 |
| 5,038,516 | 8/1991 | Doucette | 43/131 |

*Primary Examiner*—Chuck Y. Mah
*Attorney, Agent, or Firm*—Mark P. Stone

[57] ABSTRACT

A system for termite detection and control is provided by a subterranean bait station having a perforated outer housing permanently implanted in the terrain below ground level, and a perforated cartridge removably received within the housing. In one aspect of the invention, first and second removable cartridges each include partitions for dividing the total volume of bait material in each of the cartridges into several different sections. In a further aspect of the invention, the openings in the housing and in the first and second removable bait cartridges are dimensioned and configured to exclude the passage therethrough of certain preselected insects. In a still further embodiment of the invention, guides are provided for guiding termite travel in a direction towards the bait cartridge. The guides can include an element for reversing the direction of travel of termites moving away from the bait back towards the bait.

12 Claims, 6 Drawing Sheets

SYSTEM FOR TERMITE DETECTION AND CONTROL

The present application is a continuation-in-part of Ser. No. 07/941,460, filed Sep. 8, 1992 (now U.S. Pat. No. 5,329,726, issued on Jul. 19, 1994).

BACKGROUND OF THE INVENTION

The destructive nature of species of termites which ingest the wood of structures and other construction materials is well known. The presence of termites and their onset of destructive activity is generally difficult to detect and control since termites are subterranean and forage cryptically, and destruction occurs internally within wooden structures and provides no external signs of damage until termite infestation is at a relatively advanced stage.

Current conventional control procedures for subterranean termites involve digging a trench around a structure to be protected, depositing a pesticide within the trench, and pressure injecting pesticides. Applications are also made from the inside of structures by drilling holes in slab floors and footings and injecting termiticides. Such treatments are only prophylactic; their goal is to provide a continous chemical barrier between the structure and the termite colony in the soil. This procedure has several disadvantages. No means are provided for monitoring termite activity prior to depositing a pesticide within the soil, so the efficacy of the control procedure cannot be assessed. Additionally, the pesticide is deposited around a structure, often without knowledge of which areas are most at risk for infestation. It is extremely difficult to achieve a complete or uniform chemical barrier around the perimeter and beneath a building, rendering the structure vulnerable to termites which find breaches in the application. Once the pesticide is applied to the soil, it cannot be removed. Finally, the termite colony likely remains viable foraging on food sources outside of the chemical barrier, thus poised to reinfest upon degradation of any portion of the chemical treatment.

Drywood termites, which nest within the wooden structures they ingest, are likewise difficult to control. The currently dominant method of remedial control involves fumigation, or tightly tenting the entire structure and pumping in lethal concentrations of methyl bromide or Vikane gases. Preventive measures include using a chemically treated wood in the original construction; applying chemical "paints" (preservatives or pesticides) or other finishes to seal and protect cracks within wooden structures; or depositing a pesticide directly into wooden structures through holes drilled for the purpose of internally applying the pesticide. These known methods provide no means for readily detecting a termite infestation.

It is the primary object of the present invention to provide an improved system for diagnosing and monitoring termite activity, determining the extent of an infestation, and and thereafter controlling termite infestation if termite activity is detected. The improved system, in its preferred embodiment, eliminates the disadvantages of the known methods discussed above by providing means for detection of termite activity before a pesticide is applied, and thereafter applying a removable pesticide to only localized control stations. The detection and control of termite activity is accomplished without disturbing the pre-existing environment of a termite colony to assure continued access of termites to the bait station. Other objects and advantages of the present invention will become apparent from the following description thereof.

SUMMARY OF THE INVENTION

The present invention provides an improved system for both detecting termite activity in a target area, and thereafter suppressing termite infestation. A perforated housing is permanently implanted in the targeted terrain at or below ground level, and a perforated non-toxic bait cartridge is removably received within the housing. The openings in the housing and the bait cartridge are oriented such that the respective openings are in alignment with each other when the cartridge is fully received within the housing in its operational position. The bait cartridge includes a highly preferred termite food, which encourages feeding and thus reveals the presence of subterranean termites which will forage and burrow into the cartridge through the aligned openings in the cartridge and the housing. Each cartridge has an internal wick, preferably augmented by a refillable water reservoir, to provide continuous slow-release moisture to the bait formulation. Preferably, the bait cartridge is at least in part transparent, and will be periodically removed from the housing to inspect for termite presence or activity. If no termite activity is detected, the bait cartridge is replaced within the housing to again be monitored at some time in the future. Once termite activity is detected at the monitoring stations, pesticide containing bait cartridges are substituted for the non-toxic bait cartridges within each housing. The pesticide containing cartridge includes openings corresponding to the openings in the bait cartridge, and thus the openings in the pesticide containing cartridge will also be aligned with the openings in the housing when the pesticide containing cartridge is substituted for the non-toxic bait cartridge. The substitution of the pesticide containing cartridge for the non-toxic cartridge will not disturb pre-existing galleries or passageways established by termites to provide access between the termite colony and the openings in the outer housing of the control station because the outer housing remains fixed relative to the terrain and the openings in the pesticide cartridge remain in alignment with the openings in the housing. Accordingly, termites are provided with continued access to the pesticide-containing bait cartridge within the housing, thus permitting continuous feeding and the transport of pesticide-containing food to the termite colony through the pre-established connections between the colony and the bait stations. It is known that food is shared within termite colonies through regurgitation with nestmates.

The system described above permits diagnosing and monitoring termite activity by inducing the foraging termites of a colony to direct foraging towards and utilize food from localized stations. The galleries or passageways established between a termite colony and the bait station are thereafter employed to provide the colony with access to a toxic bait provided at the station. The pesticide is applied only after termite activity is detected, and then is only removably deposited in a localized and controlled station within the target area. Since the bait and pesticide agents are applied to the control station by removable cartridges, expended cartridges may be easily replaced with fresh cartridges without disturbing the surrounding environment, in a manner similar to the above described substitution of the pesticide containing cartridge for the non-toxic cartridge.

In a further aspect of the invention, a perforated outer housing may be mounted directly to an external surface of a wooden structure to be monitored and/or treated. In this embodiment of the invention, only the surface of the housing in contact with the external surface of the wooden structure is perforated, since termites can only enter the housing through the housing surface adjacent to the wood surface to which the housing is mounted. The housing is adapted to receive non-toxic bait and pesticide containing cartridges having openings which are oriented to be in alignment with the openings in the contact surface of the housing when a cartridge is fully received in the housing in its operational position. The housing is fixedly mounted to the external surface of the wooden structure, the cartridges are removably received within the housing, and the operation of this embodiment of the invention to monitor and control termite activity is identical to that discussed above with respect to the subterranean monitoring and control stations.

In further embodiments of the present invention, a supplemental supporting and partitioning structure for the bait cartridges is provided for the purpose of: subdividing the overall volume of bait material into a plurality of smaller volume sections or compartments; increasing the surface area of the bait material to increase the probability of occupation of the bait cartridge by termites to increase the consumption of bait material available to the termites for occupation and feeding; and providing internal supplemental support to the bait material of the bait cartridge. Means are provided to enable termites in one subdivided compartment of bait material to gain access into adjacent subdivided compartments of the bait material.

In a still further embodiment of the present invention, one or more projections extend outwardly from a bait cartridge or bait housing containing a bait cartridge for the purpose of directing travelling termites in the vicinity of the bait material directly towards the bait material to induce termite feeding and occupation thereof. In this manner, the bait material will be occupied by termites in the immediate vicinity thereof which originally were not sufficiently close to be directly induced to enter and occupy the bait material.

The embodiments of the present invention provide improved and efficient methods, systems and devices for monitoring termite activity within a predetermined target area, detection of termite activity, and control of any detected termite activity. The monitoring and detection procedure in accordance with the present invention is both more efficient and safer than methods currently used for termite detection and control.

BRIEF DESCRIPTION OF THE DRAWINGS

FIG. 1b illustrates an exploded perspective view of one embodiment of a removable cartridge receivable within the housing illustrated by FIG. 1a;

FIG. 2b is a perspective view of a removable cartridge receivable within the housing illustrated by FIG. 2a;

DESCRIPTION OF THE BEST MODES FOR CARRYING OUT THE INVENTION

The present invention provides improved methods, devices and systems for both detecting the presence of termites, and for controlling termite activity upon detection. The invention capitalizes upon the instinctive behavior of termites for its effective operation. Subterranean termites, which typically dwell in the soil often form large colonies. Members of the colony forage for food and thus burrow galleries or passageways in the soil outwardly from the nest. Portions of the food located by the foraging termites are returned to the nest. Termites are known to possess means for communicating the location of a food source to other termites within the colony. Subterranean termites also share food with other colony members that have not fed directly at the food. The aforementioned behavior characteristics of termites within a colony are used by the methods and apparatus of the present invention to effectively diagnose and control subterranean termite infestations.

Figure 1A:
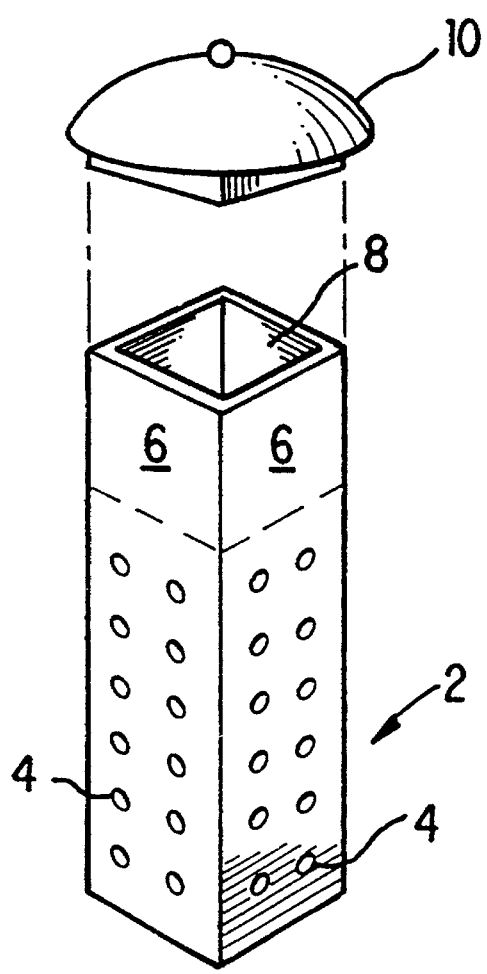
FIG. 1a illustrates an exploded perspective view of one embodiment of a fixed outer housing of a subterranean termite monitoring and control station in accordance with the present invention.
Figure 1B:
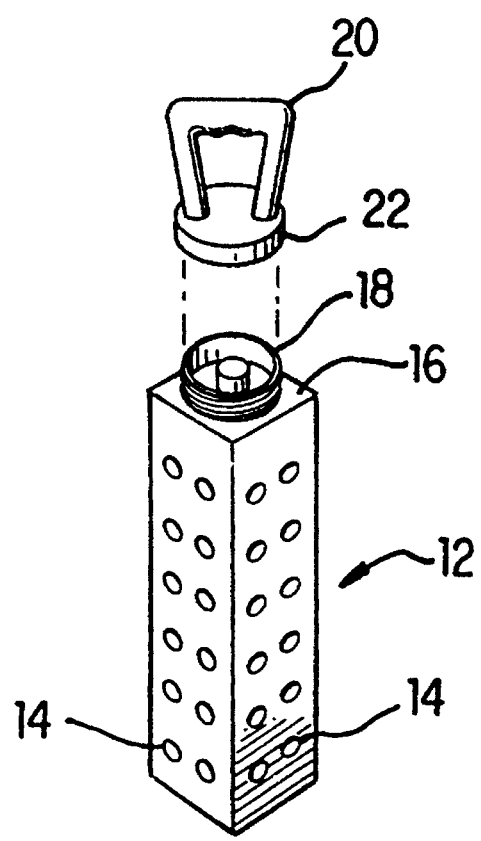

FIGS. 1a and 1b illustrate an exploded view of the components of termite monitoring and control station in accordance with one embodiment of the present invention. A substantially hollow rectangular shaped housing generally illustrated by reference numeral 2 defines a plurality of apertures 4 on portions of each outer side surface of the housing. Preferably, the housing is formed from a durable, corrosion resistant material, as for example, an acrylic or high strength plastic. The upper portions 6 of each side of the housing are imperforate, and the top surface 8 of the housing is opened. A cap 10 is removably received on the top surface 8 to close the housing 2.

Referring now to FIG. 1b, a cartridge designated generally by the reference numeral 12 is configured as a solid rectangle to complement the configuration of the housing 2. The cartridge defines a plurality of openings 14 on each of its outer surfaces which, as will be discussed in further detail below, are aligned with the corresponding openings 4 on the housing 2 when the cartridge 12 is received in an operational position within the housing 2. The outer width of the cartridge 12 is slightly less than the inner width of the housing 2 so that the cartridge may be removably received in a snug fitting relationship within the housing. A circular threaded flange 18 extends upwardly from the top surface 16 of the cartridge, and a handle 20 having a complementary threaded base portion 22 is removably securable to the flange 18 by complementary screw threads. Preferably, the length of the cartridge 12 when the handle 20 is mounted to the top thereof is less than the length of the housing 2 so that the cartridge and the handle can be received within the housing in a manner which will not interfere with placement of the cap 10 to cover the top surface of the housing 2. Preferably, for reasons which will be more fully discussed below, the cartridge is transparent (or at least partially transparent).

Figure 2C:
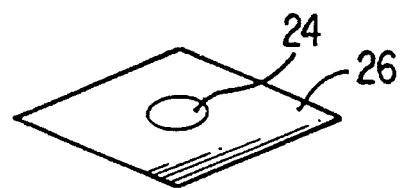
FIG. 2c is a sectional view of the cartridge illustrated by FIG. 2b.
Figure 2A:
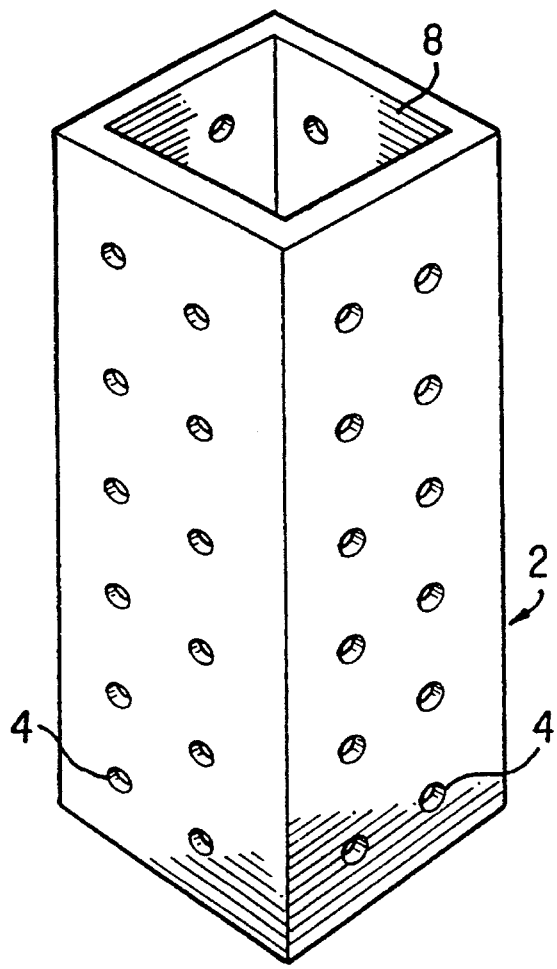
FIG. 2a is a perspective view of a further embodiment of a housing for a subterranean termite monitoring and control station in accordance with the present invention.
Figure 2B:
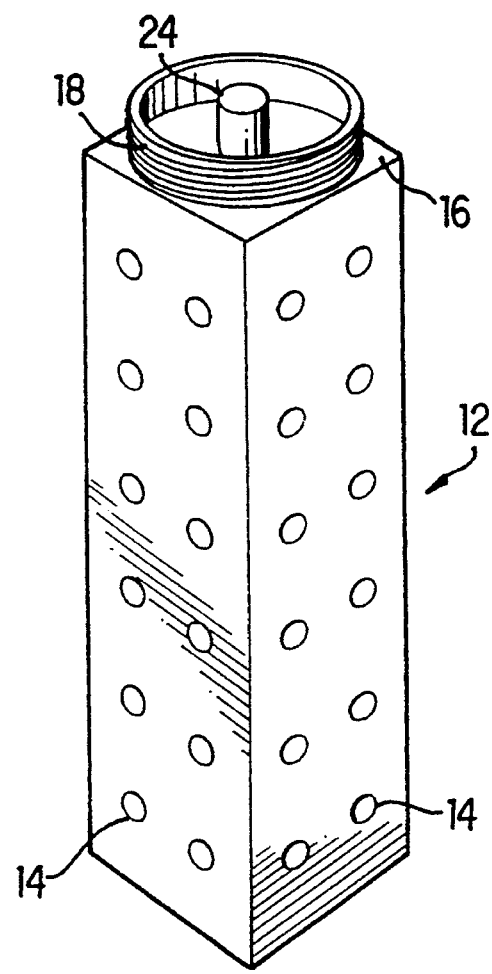

FIGS. 2a–2c illustrate a second embodiment of the invention similar to the embodiment previously discussed with respect to FIGS. 1a–1b. The same reference numerals have been used to designate common components corresponding to the first embodiment. The basic difference between the two embodiments is that the housing 2 of the second embodiment does not include sides having imperforate top portions but the openings 4 are distributed throughout the length of each side of the housing. The height of the housing corresponds to the height of the cartridge 12, and the handle 20 extending upwardly from the top surface of the cartridge (See FIG. 1b) will be received within a hollow portion of the cap 10 (See FIG. 1a) covering the opened top surface of the housing 2. As discussed with respect to FIGS. 1a and 1b, the housing and the cartridge are formed in the same geometrical configuration and are of cross-sectional dimensions which permit the cartridge to be removably received within the housing in close fitting relation therewith. The openings 4 in the housing and the openings 14 in the cartridge are oriented such that the respective openings are in alignment when the cartridge is fully received within the housing in its operational position, i.e., the base of the cartridge supported by the base of the housing.

FIG. 2c illustrates a section taken through the cartridge 12. The cartridge consists of a chemical composition 26 and a centrally disposed wick 24 extending longitudinally through the cartridge. The wick is provided for retaining or adding moisture to the cartridge, and a refillable water reservoir (not shown) may also be provided to augment the wick.

The structure illustrated in FIGS. 1 and 2 of the drawing is employed to provide a station for monitoring and controlling subterranean termite activity. The housing 2 is fixedly implanted in the terrain of a target area to be monitored. The top surface of the housing 2 (or the top of the cap 10 when the cap is used to cover the housing) is substantially even with ground level of the terrain. However, the housing may also be implanted in the soil so that a small portion of its top extends above ground level to provide for easy identification of the location in which the housing is implanted. In this arrangement, the unperforated top portion 6 of the housing illustrated by FIG. 1a will extend above the ground, thereby providing a barrier to prevent surrounding soil from falling into the housing. When the housing is implanted totally beneath ground level, the cap 10 will shield the interior of the housing from surrounding soil.

Once the housing is implanted in a preselected location in the soil, a transparent bait cartridge is inserted within the housing. This bait cartridge comprises a non-toxic bait material designed to determine if termites are present in a target area surrounding the housing. The presently preferred bait material comprises a composition formed from an agar mixture (or other suitable nutrient binding medium), processed decayed birch, uric acid, and water. Other termite preferred foods or attractants may also be used in connection with the present invention. If termites are present within the area surrounding the cartridge, foraging termites find the bait attractive. They will construct galleries or passageways from their nest to the cartridge, thus establishing a network between the colony and the bait cartridge.

The aligned openings 4 and 14 in the housing 2 and the cartridge 12 (when the cartridge is received within the housing.) provide foraging termites with access to the cartridge. The cartridge is periodically removed from the housing, which remains fixedly implanted within the soil, for inspection to diagnose and monitor termite activity and presence. As noted, the bait cartridge is preferably transparent so that termite presence therein is readily observed upon removal of the cartridge from the housing. If no termite activity is observed in the cartridge, the same cartridge (or a fresh diagnostic bait cartridge) is returned into the housing for subsequent inspection at a future date. However, if termite activity is observed, pesticide containing bait cartridges are substituted in each housing within the monitoring system for the non-toxic bait cartridges. The pesticide containing cartridge is identical in structure to the non-toxic bait cartridge, and thus the openings 14 in the pesticide containing cartridge are also aligned with the openings 4 in the housing to provide subterranean termites with access to the pesticide through the housing. As used herein, the term pesticide is intended to include insecticides, insect growth regulators, biological pathogens, and other agents for exterminating living pests including insects.

It is significant to note that the removal and replacement of cartridges within the housing does not disturb the pre-existing netwrk of access galleries or passageways previously established between the termite colony or nest and the access openings 4 in the housing since the housing is not displaced during removal and substitution of the cartridges. Thus, communication and access between the pesticide containing cartridge and the termite colony is immediately established upon substitution of the pesticide containing cartridge for the non-toxic bait cartridge. Foraging termites ingest the pesticide-containing food and also return portions of the toxic food to the nest through the pre-existing network of passageways. The pesticide is preferably of the delayed-action type, or an insect growth regulator, pathogen or metabolic inhibitor. Preferably, it comprises the previously described non-toxic bait composition to which the pesticide hydramethylnon is added in the present formulation. Other termite pesticide compositions, may also be used in connection with the present invention.

It is apparent that the system described above monitors subterranean termite presence and activity in a target area, and further provides for efficient contol of termite infestation if termite activity is detected. The system safely assures that pesticide is only applied to localized target areas in the terrain, and only after the existence of termite activity has been confirmed. Thus, indiscriminate application of pesticide to widespread regions of terrain is eliminated by the present invention. Moreover, the pesticide, which is applied in cartridge form, is safe to handle, may be completely removed from the terrain, and is easy to dispose. The system further provides means for easily removing a used bait or pesticide containing cartridge within the housing, and replacing the expended cartridge with a fresh cartridge of the same type. In essence, this procedure directs pesticide to the colony to safely suppress termite foraging.

Although not shown in the drawing, other modifications of the disclosed structure may be made. For example, ports may be provided on the cartridge top 20 (FIG. 1b) to provide easy access to the cartridge wick 24 for rehydrating the wick. The cartridge may also be provided with internal or external flanges extending from the openings 14 to provide further guidance for termites into the cartridge. The cartridge may also define spaces for termites to nest therein. The cap 10 for the housing or the top 20 for the cartridge may be provided with support means for upwardly extending identification markers to easily locate the monitoring and control stations after they are implanted into the soil.

Although the preferred embodiment of the invention employs separate bait and pesticide containing cartridges which are successively received within the housing, a single cartridge having a core comprising a pesticide surrounded by a non-toxic bait material may also be used. In this later modification, although the pesticide is applied to the terrain before termite activity is detected, it is applied in a localized, confined and controlled manner. Moreover, the outer non-toxic bait material surrounding the pesticide shields the pesticide from exposure until termites have burrowed through the outer layer and into the pesticide.

Figure 3A:
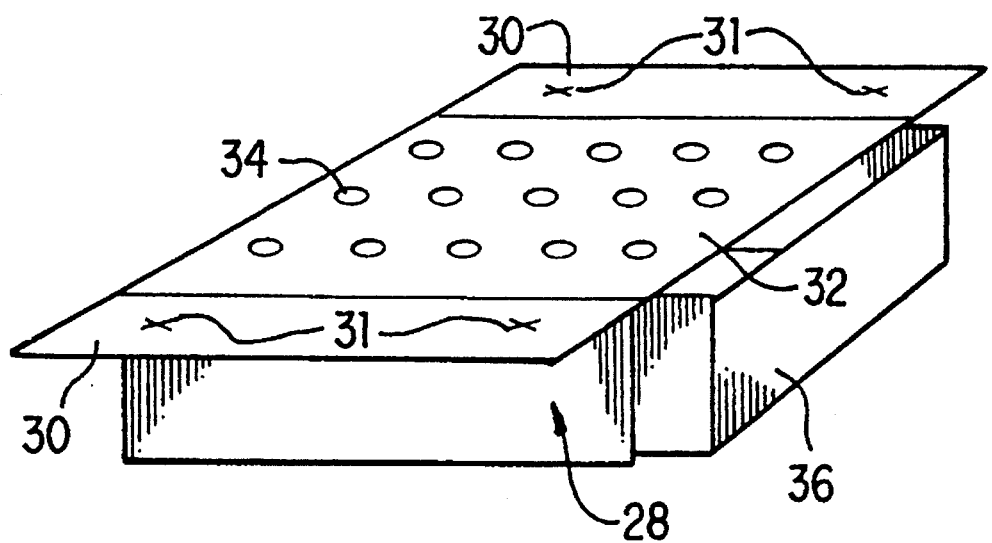
FIG. 3a is a perspective view of an embodiment of the invention useful for above-ground monitoring and control of termite activity.

FIG. 3a illustrates a third embodiment of the invention which is intended to diagnose, monitor and control termite activity above the ground and within wooden structures. It is known that wood ingesting termites nest internally within the structure in which they are devouring. As illustrated by FIG. 3a, a housing 28 is fixedly mounted relative to a portion of an outer surface of a wooden timber (not shown) by conventional mounting means, as for example, by a pair of opposed flanges 30 having mounting openings 31 extending laterally outwardly from a front surface 32 of the housing. Unlike the housings 2 and 12 of the previously discussed embodiments, only the front surface 32 of the housing 28 defines apertures 34, and the remaining surfaces of the housing are imperforate. The housing is mounted to a timber such that the perforated housing surface 32 is in contact with an adjacent external surface of the timber. In the present embodiment, it is only necessary that one side of the housing be perforated because, unlike the previous embodiments in which the housing is implanted within the terrain and termites have access to all sides thereof, termites in a timber have access to the housing only through the single housing surface directly in contact with the timber.

A cartridge 36 formed in the same geometrical configuration as the housing, but smaller in width, is removably received in close fitting relationship within the housing. A plurality of openings defined on the side of the cartridge adjacent to the front surface 32 of the housing are oriented to be in alignment with the openings 34 in the housing when the cartridge is received within the housing in its operational position.

The operation of the FIG. 3a embodiment of the invention is similar to that described with respect to the earlier discussed embodiments. A bait cartridge for attracting termites is initially inserted into the housing, and is periodically removed for visual inspection and detection of termite activity. Preferably, the bait cartridge is transparent to more readily detect termite presence by a simple visual inspection. If termite activity is detected, a pesticide containing cartridge, which corresponds identically in structure to the bait cartridge, is substituted for the bait cartridge and inserted in the housing. The position of the housing remains fixed relative to the timber during replacement or substitution of cartridges, and pre-existing galleries or passageways established by the termites between their nest and the housing remain intact and undisturbed. The termites subsequently have access to and are exposed to the pesticide containing cartridge, portions of which are returned to the nest by foraging termites through the pre-existing network of passageways.

The advantages of the FIG. 3a embodiment, which are similar to the advantages exhibited by the previously discussed embodiments, enable predetermined structures to be monitored for termite activity, thus providing means for detecting termite presence. The pesticide is not applied until termite presence is detected, and thereafter the pesticide is applied in a controlled manner and only to a localized target area. The pesticide is applied as a cartridge and therefore may be safely stored, applied, and disposed. As discussed with respect to the earlier described embodiments, a single cartridge including a toxic core surrounded by a non-toxic bait material may be employed instead of two separate, exchangeable cartridges.

Figure 3B:
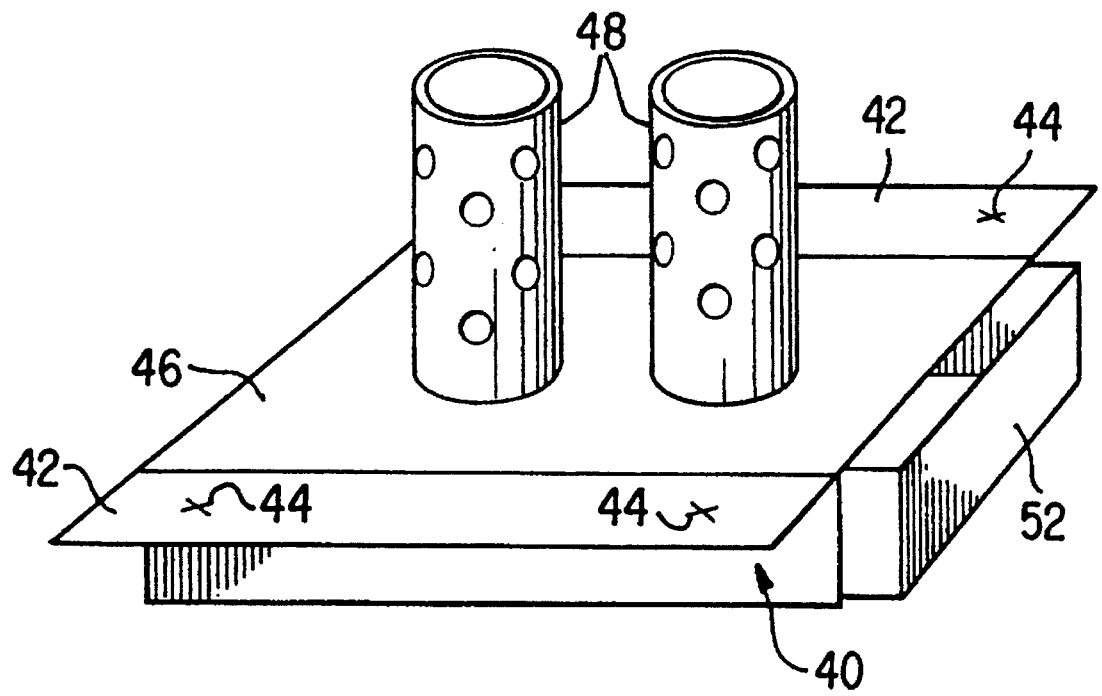
FIG. 3b a perspective view of a further embodiment of the invention useful for above-ground monitoring and control of termite activity.

FIG. 3b is a further embodiment of a termite monitoring and control system applied to an external surface of a wooden article, in accordance with the present invention. A housing 40 includes opposed, laterally extending flanges 42 each having openings 44 for mounting the housing to a portion of an outer surface of a wooden article to the monitored, such as a timber. A front contact surface 46 of the housing abuts against the outer surface of the wooden article in the operational position of the system. A pair of cylinders 48 extend transversely outwardly from the front contact surface 46 of the housing. Each cylinder 48 defines a plurality of openings 50 on its respective sidewall. The cylinders contain a bait material for attracting termites to enter the openings 50. The bait containing cylinders 48 are in communication with a removable cartridge 52 inserted into the housing.

In operation of the above embodiment, openings corresponding to the cross-sectional dimensions of the respective cylinders are drilled into a surface of the wooden article to be treated. Thereafter, the housing 40 is oriented relative to the wooden article such that the cylinders 48 are received within the drilled openings, and the front surface of the housing is thereafter mounted flush against the outer surface of the article by means of the flanges 42. Termites within the article being treated enter the cylinders 48 through the openings therein, and thereafter enter the cartridge 50 containing further bait material. The bait cartridge, which is preferably transparent, is periodically removed from the housing to inspect for termite activity. If termite activity is detected, the bait cartridge is replaced with a pesticide containing cartridge which is removably received within the housing 40.

The embodiment of the invention disclosed by FIG. 3b is advantageous in that pesticide is applied to the system only after termite activity has been detected, and it is then applied only in a controlled and localized manner. Termites within an infested timber are induced out of the timber.

The preferred embodiments of the invention discussed herein employ a two stage termite monitoring and control system in which a first bait cartridge for detecting termite presence is replaced with a second pesticide containing cartridge only after termite activity has been confirmed. As also discussed, it is within the scope of the present invention to employ a single cartridge formed from a central core of pesticide containing material surrounded by an outer layer of non-toxic bait material. In this manner, both detection and control of termite activity may be accomplished using a single combined cartridge. In this modification, although the pesticide containing material is initially received within the housing before any termite activity is detected, it nonetheless is not exposed until termites are present and have burrowed through the outer bait material. Other than the use of a combined bait/pesticide containing cartridge, this modified embodiment of the invention operates along the same principles as discussed with respect to the earlier disclosed embodiments.

Figure 4:
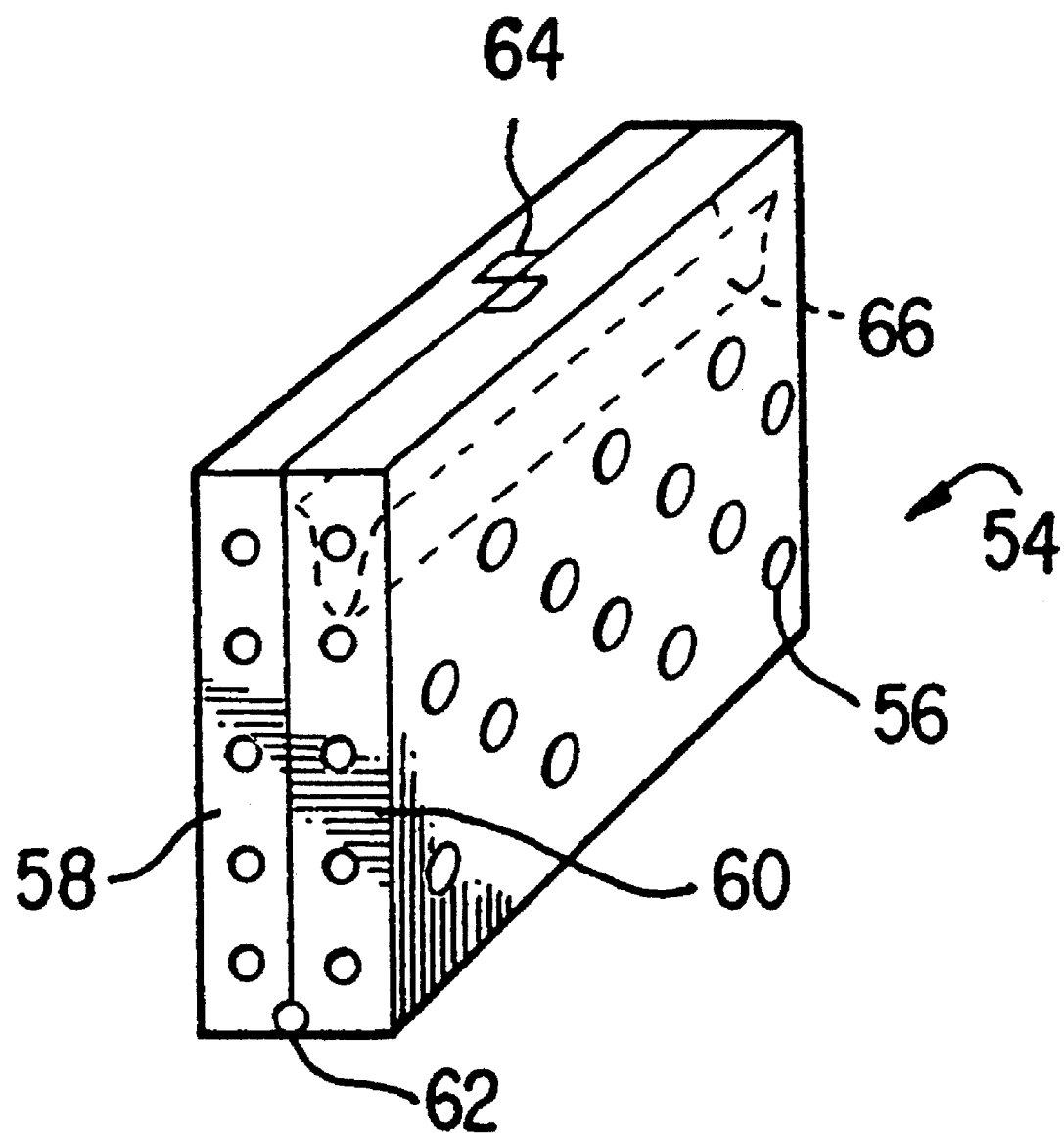
FIG. 4 is a perspective view of a further embodiment of a housing for monitoring and controlling termite activity in accordance with the present invention.

FIG. 4 of the drawings illustrates a further embodiment of the system of the present invention. A bait cartridge of the type discussed above is received within an apertured inner housing 84 defining a plurality of apertures 56 on one or more outer surfaces thereof. The inner housing is formed from two hinged pieces 58 and 60 joined by an internal hinge 62 provided at the bottom of the lateral ends of the inner housing. The inner housing is selectively openable and closable by pivoting the two opposed sections 58 and 60 relative to each other along the hinge 62. A pair of conventional locking clips 64 is mounted to the center of the top side of the inner housing for releasably locking the opposed housing sections together when the inner housing is closed. A bait or toxicant cartridge is removably received within the apertured inner housing, and the inner housing is itself is removably received within a permanently positioned outer housing within a bait station, in the same manner as previously discussed herein. The internal hinges mounted to the inner housing are located in positions which will not interfere with the insertion and removal of the inner housing into and out of the fixed outer housing of the bait station. A reservoir 66 may be defined in the inner housing to provide a source of water connected to a wick (See FIG. 2b) for retaining or adding moisture to the cartridge enclosed within the inner housing.

The embodiment of the invention illustrated by FIG. 4 advantageously enables direct inspection of a bait cartridge for termite consumption and occupancy, and permits thorough observation of a cartridge unimpeded by the inner housing. Cartridges may be easily removed, inspected, and exchanged through use of the selectively openable inner housing as discussed herein.

Other modifications of the disclosed termite detection and control systems are within the scope of the present invention. For example, although the housings and cartridges have been illustrated as being square or rectangular in cross section, they may be formed in other geometrical configurations provided that both the housing and the cartridge are of the same complementary configuration. The specific orientation and number of access openings in the housing and in the respective cartridges may be varied from that disclosed in the drawing, provided that the openings in the housing and the cartridges are oriented relative to one another to provide alignment of at least one housing opening and at least one cartridge opening to permit termit access to the cartridge through the housing. Moreover, although the respective openings in the housing and the cartridges preferably are of the same size and are in exact registration or alignment when a cartridge is received in its operational position within the housing, it is only necessary that a portion of at least one housing opening be aligned with a portion of at least one cartridge opening to provide access to the cartridge through the housing.

In the embodiments of the invention discussed above, a bait material is disposed within a cartridge, and the cartridge is removably received within a fixedly positioned outer housing. The relative dimensions of the cartridge and the bait material therein may be selected so that the inner sidewalls of the cartridge are contiguous with the outer surface of the bait material. In the alternative, the dimensions may be selected such that a clearance or cavity is defined between the inner sidewalls of the cartridge and the outer surface of the bait material. In the latter alternative, a greater surface area of the bait within the cartridge is made available for termite feeding to recruit termites in large numbers and induce bait occupation and compact grouping of termites in the cavity defined between the bait and cartridge walls. This can be accomplished by different means, as for example, recessing the outer surface of the bait a predetermined distance (e.g., 3/32") from the inner sidewalls of the cartridge, or arranging the bait in a spiral configuration within the cartridge contiguous with the inner surface of the cartridge proximate to the openings defined therein. Additionally, the cartridge and the outer housing may be relatively dimensioned such that a gap or cavity is defined between the outer surface of the cartridge walls and the inner surface of the housing to provide areas for termite grouping proximate to the bait.

It is further within the scope of the invention to provide a block or solid bait material removably received within the outer housing but not contained within a cartridge. The bait may define openings aligned with the openings in the outer fixed housing when the bait is fully received within the housing to induce termite feeding, or the bait may be devoid of such openings. Moreover, the solid bait material may be received in the housing contiguous with the inner perforated sidewalls of the housing, or the bait may be configured to define cavities or gaps between the outer surface thereof and the inner sidewalls of the housing to result in the advantages discussed above.

Although the openings defined in the bait cartridge and cartridge housing have been illustrated as being primarily circular in configuration, it is within the scope of the present invention to provide said openings in other geometrical configurations. For example, rectangular shaped openings, slits or slots may be defined on the bait cartridge and bait cartridge housing in lieu of circular and arcuate configured openings for the purpose of excluding access by insects other than termites having a size or shape which will not permit passage through said openings. Moreover, the specific dimensions of the openings defined in the bait cartridge and the bait cartridge housing can be selected to exclude passage of certain insects other than termites for each geometrical configuration of openings employed. For example, when the termite detection system in accordance with the present invention is used in geographical areas in which it is desirable to prevent entrance into the bait material of insects other than termites which are larger than the termites, the relatively larger circular openings defined in the bait cartridge and bait cartridge housing can be replaced by clusters of smaller openings. The total opening area will remain constant, but the openings are selectively configured to permit passage by termites but to prevent passage by other insects larger than termites which may be prevalent in the specific geographical location in which the termite detection system is being employed.

Figure 5A:
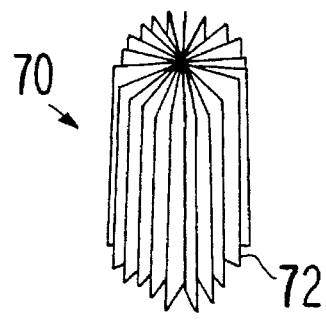
FIGS. 5a and 5b illustrate perspective views of supplemental supporting and partitioning structures for the bait material of the bait cartridge in accordance with the present invention.
Figure 5B:
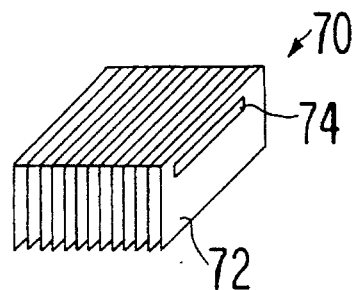

Referring now to FIGS. 5a and 5b of the drawings, a supplemental supporting and partitioning structure for the bait material of the bait cartridge in accordance with the present invention is generally illustrated by reference numeral 70. The structure 70 may be removably mounted within a bait cartridge, or fixedly embedded within the bait material of a bait cartridge, including both diagnostic or pesticidal bait in accordance with the present invention. The structure 70 includes a plurality of interconnected plates or partitions illustrated by the reference numeral 72. In the FIG. 5a embodiment of the supporting structure, the partitions 72 are arranged radially to define a generally circular or cylindrical configuration, while in the embodiment illustrated by FIG. 5b, the partitions 72 are arranged sequentially parallel to each other to define a generally square or rectangular configuration. The structure of FIG. 5a will be used to receive a bait cartridge having a corresponding arcuate or cylindrical configuration, while the structure of FIG. 5b will be used to receive a bait cartridge having a corresponding square or rectangular configuration. As illustrated by reference numeral 74, an access port is defined in each panel 72 of the structure of FIG. 5b to permit termite passage through each of the panels into adjacent compartments formed by adjacent pairs of panels. Although not illustrated in the drawing, the structure illustrated by FIG. 5a also includes access ports or openings defined in each of the panels 72 to permit termite passage therethrough into adjacent compartments. In lieu of providing openings in the panels 72, or in addition thereto, it is within the scope of the present invention to vertically displace adjacent panels 72 relative to each other to permit termites to pass from one compartment defined by two adjacent panels into an adjacent compartment by burrowing above or below one of the vertically displaced panels 72. Preferably, the surfaces of the panels are formed from a material which is slightly roughened to facilitate termite grip and transit along the panels after the bait material which was initially affixed to the outer surface of the panels has been eaten or otherwise removed therefrom.

Figure 6A:
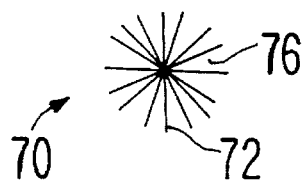
FIGS. 6a and 6b illustrate, respectively, cross sectional views of the supplemental supporting and partitioning structures illustrated by FIGS. 5a and 5b.
Figure 6B:
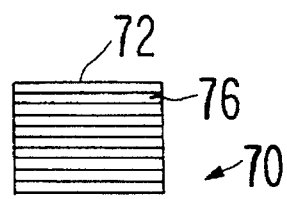

FIGS. 6a and 6b illustrate cross-sectional views of the structures 70 illustrated by FIGS. 5a and 5b, respectively. The discussion of FIGS. 5a and 5b also applies to FIGS. 6a and 6b. Additionally, FIGS. 6a and 6b illustrate that the two outer surfaces of each of the plates 72 can be grooved or corrugated, and the ridges of the grooves are separated preferably by approximately 2.5–3.5 mm to attract termites to the surfaces by exploiting their thigmotactic behavior. Bait material, either diagnostic or pesticidal, is applied to adhere to both outer surfaces of each of the plates 72 to result in a plurality of separate, adjacent compartments of bait material defined between adjacent plates and illustrated generally by reference numeral 76. FIGS. 6a and 6b more clearly illustrate that the partitions 72 of the structure 70 of FIG. 5a are oriented radially relative to the central axis of a bait cartridge, while the plates 72 of the structure 70 illustrated by FIG. 5b are oriented parallel to each other.

Figure 7:
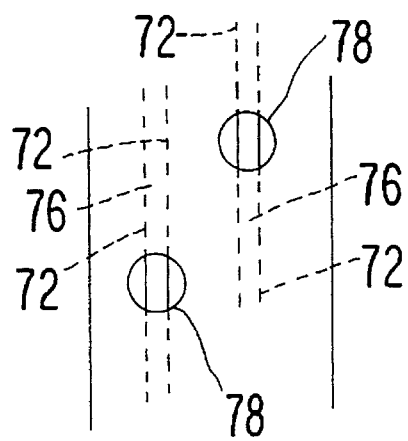
FIG. 7 schematically illustrates the relative orientation of openings defined in the bait cartridge and the partitions of the supplemental structure illustrated by FIGS. 5a and 5b.

FIG. 7 schematically illustrates the orientation of openings 78 defined in the bait cartridge and the sections or compartments 76 defined between adjacent plates 72 of the structure 70 illustrated by FIGS. 5a and 5b. The openings 78 are oriented such that access therein is not completely blocked by the plates 72. In this manner, termites entering opening 78 in the bait cartridge will be permitted to pass therein to occupy the bait, and will not be prevented from entering the bait material by the partitions 72. As illustrated by FIG. 7, the structure 70 is aligned with and oriented relative to the bait cartridge such that the multiple plates 72 of the structure 70 are generally centered in the entry holes 78 defined in the wall of the bait cartridge.

Figure 8:
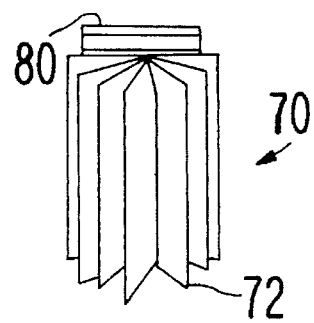
FIG. 8 illustrates, in perspective, the supplemental supporting and partitioning structure of FIG. 5a modified to include a top handle.

FIG. 8 illustrates the structure 70 of FIG. 5a, in which a handle 80 has been added to the top of the structure. In this manner, the top surface of the structure 70 receiving bait material is affixed to the handle 80 to allow the entire structure to be removed from its monitoring location (e.g., the external cartridge housing) as a single unit to permit inspection or removal of termites feeding on the bait material affixed to the plates 72.

The bait cartridge supporting and partitioning structure 70, as discussed with respect to FIGS. 5a–8, results in several distinct advantages when used in conjunction with the termite detection system in accordance with the present invention. By subdividing the bait cartridge material into several different compartments or sections, the probability of occupation of the cartridge by termites is increased because the quantity of surface area of bait material made available for termite occupation and feeding is increased. Nonetheless, the overall total volume of bait material continues to remain accessible to the termites because access between adjacent compartments or sections 76 of bait material is provided to the termites. Additionally, the subdivision of the overall volume of bait material into smaller separate adjacent compartments of bait material enhances the attraction of termites to bait by exploiting their thigmotactic behavior,—termites are more comfortable feeding in smaller spaces than in larger spaces. The structure 70 further provides enhanced internal structural support to the bait material. The partitions 72 reinforce the bait material affixed to the outer surfaces thereof, prevent collapse of the bait material which might otherwise result from uneven feeding or occupation by the termites therein, and maintain the passageways burrowed by the termites occupying or feeding in the bait material received in the structure 70.

Figure 9:
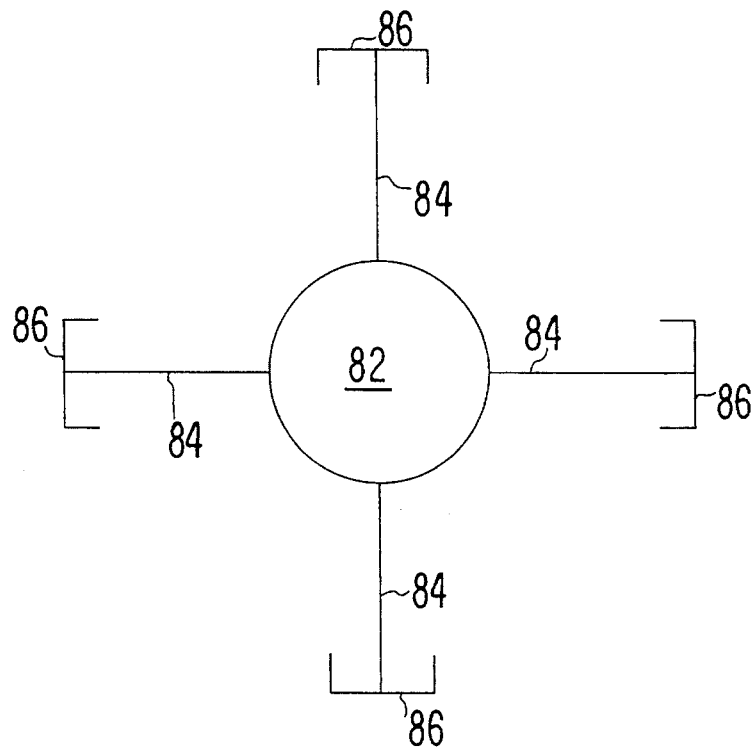
FIG. 9 illustrates, in cross section, a bait cartridge or bait cartridge housing in accordance with the present invention, including a plurality of outwardly extending projections.
Figure 10:
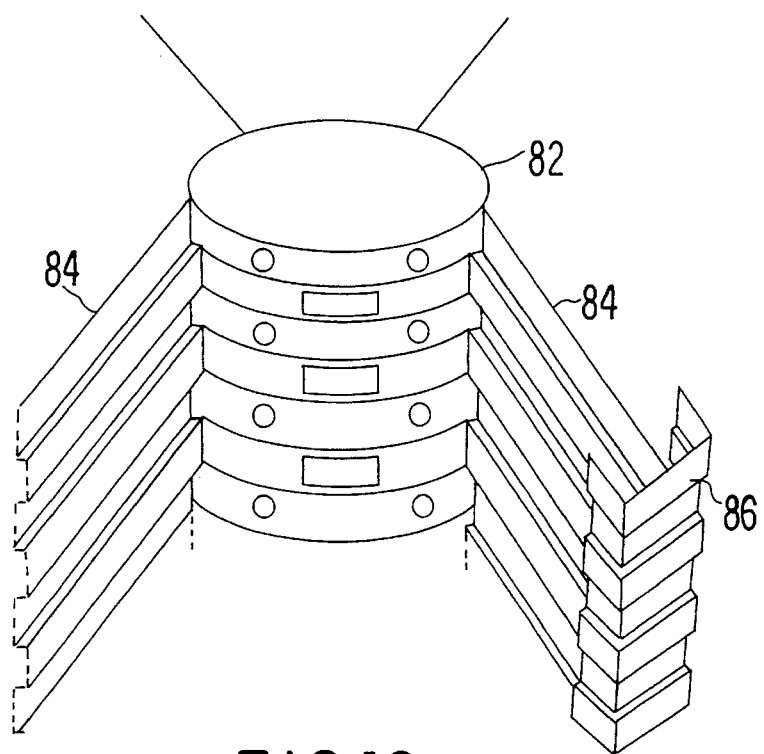
FIG. 10 is a perspective view of the embodiment of the invention illustrated by FIG. 9.

FIGS. 9 and 10 illustrate a further embodiment of the termite detection system in accordance with the present invention. A bait cartridge (or bait cartridge housing) of the type previously discussed herein, is generally illustrated by reference numeral 82. The cartridge (or housing) includes a plurality of openings or ports designed to provide access to bait material by foraging termites, as also previously discussed herein. A plurality of projections or arms 84 extend outwardly from the outer surface of the bait cartridge or housing 82. The outer or remote end of each of the projections 84 terminates in a generally "U" shaped configuration 86 opening in a direction facing inwardly towards the cartridge or housing 82.

The purpose of the extensions 84 is to intercept or obstruct the path of a termite in the vicinity of the bait material 82 and direct the termite directly towards the bait material. If the path the termite travel is obstructed by the projection 84, the termite is likely to redirect his travel longitudinally along the projection 84. If the termite redirects his travel towards the bait cartridge, it will be attracted by the bait material and thus induced to enter the openings or ports as it approaches the cartridge 82. If the termite is guided in a direction along the projection 84 away from the bait material 82, it will encounter the "U" shaped configuration 86 at the end of the projection 84, and this end configuration will tend to redirect the termite direction of travel towards the bait material 82. Accordingly, the extending projections 84, which may be provided in the form of plates or sheets, is intended to obstruct termite travel which is not likely to intersect the bait material, and redirect the direction of travel of the termite to guide it directly to the bait cartridge. Preferably, the extensions 84 and the "U" shaped end portions 86 have slightly roughened outer surfaces to facilitate termite grip and travel therealong.

The embodiments of the present invention provide improved and efficient methods, systems and devices for monitoring termite activity within a predetermined target area, detection of termite activity, and control of any detected termite activity. The monitoring and detection procedure in accordance with the present invention is both more efficient and safer than methods currently used for termite detection and control.

Further modifications and variations within the scope of the present invention will become apparent to those skilled in the art. Accordingly, the embodiments discussed herein are intended to be illustrative only, and not restrictive of the scope of the invention, that scope being defined by the following claims and all equivalents thereto.

We claim:

1. A system for monitoring and controlling termite infestation, said system including:
 a housing fixedly positioned relative to a target area to be monitored for termite activity, said housing having at least one opening defined therein,
 a first cartridge removably receivable within said housing, said first cartridge including a bait material for termites and having at least one opening defined therein, said opening in said first cartridge being oriented relative to said opening in said housing such that said respective openings in said housing and said first cartridge are at least partially aligned with each other when said first cartridge is received within said housing in a predetermined operational position,
 a second cartridge removably receivable within said housing when said first housing is removed from said housing, said second cartridge containing a pesticide-containing bait material, and having at least one opening defined therein, said opening in said second cartridge being oriented relative to said opening in said housing such that said respective openings in said housing and said second cartridge are at least partially aligned with each other when said second cartridge is received in said housing in said predetermined operational position,
 said first and second cartridges being selectively interchangeably receivable in said housing,
 said first and said second cartridges each including means for partitioning the volume of said bait material of said respective bait cartridges into a plurality of different sections.

2. The system as claimed in claim 1 wherein said means for partitioning includes a plurality of panels which are radially oriented relative to longitudinally extending center axis of each of said respective bait cartridges.

3. The system as claimed in claim 2 wherein at least one opening is provided in each of said radially oriented panels for providing access between said plurality of different sections.

4. The system as claimed in claim 1 wherein said means for partitioning includes a plurality of panels which are relatively oriented parallel to each other.

5. The system as claimed in claim 4 wherein at least one opening is provided in each of said parallel oriented panels for providing access between said plurality of different sections.

6. The system as claimed in claim 1 further including handle means attached to an upper surface of said means for partitioning, said handle being provided for transporting said means for partitioning as a single unit.

7. The system as claimed in claim 1 further including means for providing access between said plurality of different sections.

8. The system as claimed in claim 1 wherein said openings defined in said first and second bait cartridges are oriented relative to said means for partitioning such that said openings in said first and second bait cartridges are not completely blocked by said means for partitioning.

9. A system for monitoring and controlling termite infestation, said system including:
 at least a first bait cartridge removably receivable in a predetermined location for attracting termites thereto; and
 means associated with said bait cartridge for guiding termites in a direction towards said bait cartridge;
 said means for guiding including at least one projection extending in a direction outwardly from said bait cartridge for obstructing the path of travel of a termite away from said bait cartridge and redirecting the path of travel of said termite towards said bait cartridge, an end of said at least one outwardly extending projection remote from said bait cartridge being configured to reverse the direction of of travel of a termite initially travelling along said at least one projection away from said bait cartridge.

10. The system as claimed in claim 9 wherein said means for guiding includes a plurality of said projections extending in a direction away from said bait cartridge.

11. The system as claimed in claim 9 wherein said at least one projection is configured in the form of a plate.

12. The system as claimed in claim 9 wherein said at least one projection has a slightly roughened outer surface.

* * * * *